United States Patent
Davis et al.

(10) Patent No.: US 6,445,727 B1
(45) Date of Patent: Sep. 3, 2002

(54) METHOD AND APPARATUS FOR QUICK ACQUISITION OF PILOT SIGNALS USING BANK SWITCHING METHOD

(75) Inventors: Mark Davis, Carlsbad; Roland Rick; Brian Banister, both of San Diego, all of CA (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/436,998

(22) Filed: Nov. 10, 1999

Related U.S. Application Data

(63) Continuation of application No. 08/955,499, filed on Oct. 22, 1997.

(51) Int. Cl.[7] .............................................. H04B 1/707
(52) U.S. Cl. ..................... 375/140; 370/350; 370/515
(58) Field of Search ................................. 375/140, 130, 375/147, 149, 150, 340, 367; 370/350, 515, 335, 320, 252; 455/502

(56) References Cited

U.S. PATENT DOCUMENTS

| | | | | |
|---|---|---|---|---|
| 5,440,597 A | * | 8/1995 | Chung et al. | 375/149 |
| 5,768,306 A | * | 6/1998 | Sawahashi et al. | 375/150 |
| 5,901,171 A | * | 5/1999 | Kohli et al. | 375/147 |

OTHER PUBLICATIONS

D. Dicarlo, "Multiple Dwell Serial Search: Performance and Application to Direct Sequence Code Acquisition," IEEE Transactions on Communications, vol. COM–31, No. 5, May, 1983, pp. 650–659.*

* cited by examiner

Primary Examiner—Stephen Chin
Assistant Examiner—Lenny Jiang
(74) Attorney, Agent, or Firm—Mitchell Silberberg & Knupp, L.L.P.

(57) ABSTRACT

When a mobile communication unit (e.g. a cellular telephone) is powered up, the unit must lock on to a local base station, or "acquire" a base station signal, to enable the user to send and receive calls. To lock on a local base station, the mobile unit must determine the delay at which the base station is sending the pseudo random (PN) code. This process is called the "acquisition." The current art of acquiring a base station involves collecting a set of samples at a particular code phase, or delay, testing the collected sample, and repeating these steps using another code phase until the correct code phase is found. The present invention discloses a method and apparatus for collecting a set of samples at a particular code phase, and simultaneously testing the collected sample and collecting the next set of samples for another code phase. Using multiple banks, the system resources such as the dwell accumulators and the DSP are used concurrently to reduce the time required to test the phase delays of the short code to lock on to a base station.

22 Claims, 2 Drawing Sheets

METHOD AND APPARATUS FOR QUICK ACQUISITION OF PILOT SIGNALS USING BANK SWITCHING METHOD

This application is a continuation application of U.S. application Ser. No. 08/955,499, filed Oct. 22, 1997.

BACKGROUND OF THE INVENTION

1. Field of the Invention

The present invention generally relates to the art of wireless communications. In particular, the present invention relates to the art of searching for the direct sequence spread spectrum pilot signals of base stations to establish communication between a mobile unit and the base station.

2. Description of Related Art

In wireless communications technology, user data (e.g. speech) is encoded in a radio frequency for transmission and reception between a base station and a mobile unit. The radio spectrum allocated by regulatory authorities for a wireless system is "trunked" to allow simultaneous use of that spectrum block by multiple units.

The most common form of trunked access is the frequency-division multiple access (FDMA) system. In an FDMA system voice is commonly transmitted through analog modulation but can in principle be digitized and transmitted with digital modulation. In FDMA, the spectrum is divided into frequency channels comprised of distinct portions of the spectrum. The limited frequency channels are allocated to users as needed. However, once a frequency channel is assigned to a user, that frequency channel is used exclusively by the user until the user no longer needs the channel. This limits the number of concurrent users of each frequency channel to one, and the total number of users of the entire system, at any instant, to the number of available frequency channels.

Another common trunking system is the time-division multiple access (TDMA) system. TDMA is commonly used in telephone networks, especially in cellular telephone systems, in combination with an FDMA structure. In TDMA, data (speech) is digitized and compressed to eliminate redundancy thus decreasing the average amount of bits required to be transmitted and received for the same amount of information. The time line of each of the frequency channels used by the TDMA system is divided into "frames" and each of the users sharing the common channel is assigned a time slot within the frames. Each user then transmits a burst of data during its assigned timeslot and transmits nothing during other times. With the exception of delays required by the bursty data transmission, the TDMA system will appear to each of the users sharing the frequency channel to have provided an entire channel to each user.

The FDMA and TDMA combination technique is used by the GSM (global system for mobile communications) digital cellular system. In GSM, each channel is divided up in time into frames during which eight different users share the channel. A GSM time slot is only 577 $\mu$s (micro-seconds), and each users gets to use the channel for 577 $\mu$s every 4.615 ms (milli-seconds). 577 $\mu$s*8 =4.615 ms.

Yet another method for sharing a common channel between multiple users is the code-division multiple access (CDMA) technique using direct sequence spread spectrum modulation. CDMA is relatively new to the cellular technology and is one of the accepted techniques to be included into the next generation of digital cellular systems in the United States of America (U.S.A.).

As with TDMA, the CDMA systems are typically used in conjunction with a FDMA structure, although this is not required. However, unlike the TDMA system, the CDMA system does not separate the multiple users of a common frequency channel using time slices. Rather, in CDMA, multiple users are separated from each other by superimposing a user-specific high-speed code on the modulation of the data of each user. Because the separating code has the effect of spreading the shared channel of each user's transmission, the CDMA system is often called a "spread spectrum" system. "Direct sequence" spreading is accomplished by multiplying a narrowband information carrying signal by a much wider band spreading signal. The error coded and digitally modulated data (speech) for each of the shared users of the CDMA channel may typically be 9.6, 14.4, or 19.2 KHz wide. This is spread using a much wider spreading signal which may be 1.2288 MHZ wide. Using the wider spreading signal, a CDMA frequency channel can accommodate many users on code sub-channels. The spreading signal is usually a sequence of pseudo random bits (PN code) and is often called a "spreading code," or "chipping code" because it "spreads" or "chips" the much slower data bits. The PN code is different for differing users, allowing a user to distinguish its code sub-channel from other users' sub-channels on the same frequency channel. The PN sequence may be expressed as c(t), where the chipping function, c( ), is a function of time t. The PN sequence is generated using a linear feedback shift register (LFSR) which outputs a random-like sequence of digital ones and zeros. These digital ones and zeros are modulated to −1 and +1 respectively and filtered to give the chipping function c(t). Thus the chipping function has the property that $c(t)^2=+1$. The PN sequence generated by a N-register LFSR is $2^N-1$ chips long, though a common system artificially inserts a zero to extend the full sequence length to $2^{15}=32768$ chips. That system has a chip rate of 1.2288 MHz, so that the sequence repeats every 26.666 ms.

In a typical system, each base station maintains a pilot channel with its own identifying spreading code for the mobile units to refer to. A pilot signal is a spread signal with no underlying information modulation, such that the exact waveform is known by both transmitter and receiver, with the exception of the waveform timing. The mobile units use the pilot channel to synchronize themselves with the base station so they can effectively communicate with the base station. When a mobile unit is powered on, the mobile unit initially searches for a pilot channel in an attempt to establish a lock with a base station. This process is called "acquisition." In order to "acquire," or lock on, to a base station, the mobile must align its locally generated version of the PN sequence with the PN sequence of the base station by determining the timing of the transmitted pilot's spreading sequence. The present invention provides for an improved acquisition technique.

At power up, a mobile unit must search for a pilot to synchronize its spreading sequence with that of a base station. The acquisition process is generally described using the system as illustrated by FIG. 1. FIG. 1 is a simplified diagram illustrating the major functions of a system which can implement the acquisition process.

In the simplified model of FIG. 1, the radio signal is received by an antenna 12. The signal at line 14 is a radio frequency signal which is about 800 to 900 MHz for cellular communications. The signal at line 14, $S_{14}$, can be expressed as $$S_{14}=d(t)c(t-D_{base}) \cos (t)$$

where d(t) is the data (speech in digitized form);

$c(t-D_{base})$ is the PN short code at delay $D_{base}$ which is the base station delay; and cos (t) is the radio frequency carrier wave.

Of course, $c(t-D_{base})$ is the spreading code sequence used in the CDMA system, and would not be present in a non-CDMA system. A pilot signal contains no data, so in the case of a pilot signal d(t)=1 and is constant. The pilot signal spreading code is a different PN code from the data spreading code, allowing the two signals to be distinguished. Once the pilot code timing is known, that same timing can be applied to the data spreading code to allow the receiver to demodulate the digital data.

The process of acquisition, then, is the process of determining the value of $D_{base}$. Once the value of $D_{base}$ is determined, the mobile can use the same $c(t-D_{base})$ sequence to lock on to the base signal and remove the spreading code to retrieve the data, d(t).

The quadrature demodulator circuit 16 removes the carrier wave portion, cos(t), from the incoming RF signal and provides a complex valued baseband signal to the sampling circuit 20 which converts the analog RF into digital samples at the spread spectrum frequency of 1.2288 MHZ. At line 22, the signal can be expressed as $$S_{22}=d(t)c(t-D_{base})$$

The base station delay, $D_{base}$, is not known by the mobile unit at power up. If $D_{base}$ is known, then the PN code delay at the mobile unit, $D_{mobile}$, can be set to match $D_{base}$, and $S_{22}$ can be multiplied by $c(t-D_{mobile})$ to eliminate the spreading sequence to retrieve the data. Alternatively expressed, if $D_{mobile}=D_{base}$, then $$d(t)c(t-D_{base})c(t-D_{mobile}) = d(t)c(t-D_{base})c(t-D_{base})$$

$$= d(t) \text{ ; because } c(t)^2 = 1$$

Fixed Dwell Search System (FDSS)

Assuming that N=15 such that the full sequence length is $2^{15}$, at power up, $D_{base}$ is not known, and the mobile must test each of the $2^{15}$ possibilities to find $D_{base}$. In the Fixed Dwell Serial Search (FDSS) systems, $D_{base}$ is found by brute-force, trial and error method which can be outlined as follows (continuing to refer to FIG. 1):

1. The incoming signal is multiplied by a multiplier 24 by a PN code with an initial delay, $D_{test}$ 44.
2. The result of the multiplication is summed, or accumulated 28, for N number of chips, N being a predetermined number of chips. The process of multiplying and accumulating for a period of time is referred to as a dwell or a dwell period. The pilot signal could be thought of as being constructed based on a sequence of zero's (0) and one's (1). It is common in the industry to refer to each digit of a digital spreading sequence as a "chip." For example, a digital spreading signal of a fixed duration containing 100 digital values can be called a set of 100 chips.
3. The energy of the accumulated value of the products are calculated 34 by taking a magnitude squared of the accumulant.
4. The calculated energy is compared to some pre-set threshold, $\gamma$, 38.
5. And, a determination is made. If the calculated energy equals or exceeds the threshold value, $\gamma$, then the given delay being tested, $D_{test}$, 44 is determined to be a potential signal and is verified. If the verification is successful, then $D_{test}$ is determined to equal $D_{base}$ and the acquisition terminates. If the calculated energy is less than the threshold value, then $D_{test}$ 44 is not equal to $D_{base}$, and the next delay value is tested beginning at step 1. In fact, the delay value is tested at every ½ chip. Therefore, the number of delays tested is $2*2^{15}$, or $2^{16}$.

The multiplication (step 1 above) and the summation (step 2) are typically done using a specially designed hardware, and is performed at the same speed as the incoming chip rate. The energy calculation (step 3) and the comparison with a threshold (step 4) could be performed in software by a digital signal processor (DSP) 42 as indicated by the dash line in FIG. 1.

If the incoming signal at line 22, $S_{22}$, is multiplied by the correctly delayed PN code, then the sum, or integration, of the energy levels of a set of chips will add up to a signal strength approaching some amplitude value, A. If the incoming signal at line 22, $S_{22}$, is multiplied 24 by an incorrectly delayed PN code 44, then the signal at line 26, $S_{26}$, will appear as noise and the sum 28, or integration, of the energy levels of the set of chips will approach zero. The DSP 42, controls the value of D 44, to increment the phase based on the dwell/threshold decisions. This "de-spreading" method is discussed in many text and reference books. For example, see Redl, et. al., AN INTRODUCTION TO GSM, pp. 61–63. In reality, however, the results of the integration do not fall exactly at A or exactly at 0, but are corrupted by noise and fall near A or near 0, and appear as some probability function near A or 0.

The Multiple Dwell Search (MDS) method is based on the facts that the mobile unit needs to find the base station delay, $D_{base}$, and that the average acquisition time, $T_{aa}$, can be minimized by quickly rejecting all other delays. To that end, first, a smaller sample (from a relatively shorter dwell period) is tested against $D_{test}$ to filter out obvious noise. If the sample fails the first test, then $D_{test}$, is rejected. On the other hand, if the sample passes the test, then $D_{test}$ is further tested by collecting another, larger set of samples. This process is more efficient than the simple FDSS because most of the delays are rejected using a smaller sized set of chips. The MDS technique achieves a quicker acquisition by decreasing the average dwell time portion of $T_{aa}$. However, the MDS technique does not address the computational time portion of $T_{aa}$. In fact, because $T_{aa}$ is a sum of the average dwell time and average computation time, or, $$T_{aa}=KT_{average\_dwell\_time}+KT_{average\_computational\_time}$$

where $T_{average\_dwell\_time}$ is average time period the mobile unit dwells at each delay;

$T_{average\_computational\_time}$ is the average time period the mobile unit takes to calculate the energy from a dwell and compare it to a predetermined threshold; and K is the sample range, or the number of possible delays that must be searched, and is set to $2^{16}$, not $2^{15}$ because the delay is tested at ½ the chip increments.

Any decreases in the $T_{average\_dwell\_time}$ portion of the equation increases the prominence in, or the ratio of the $T_{average\_computational\_time}$ in the overall $T_{aa}$ determination.

In summary, because the dwelling and the computational steps of the acquisition processes are serially performed, the average acquisition time, $T_{aa}$, is unnecessarily increased by 25% to 33% in the FDSS system. The negative impact of the computational step to the overall $T_{aa}$ is even larger for other more efficient acquisition techniques such as the MDS technique.

SUMMARY OF THE INVENTION

Therefore, an object of the present invention is to eliminate the time required to calculate the energy of an incoming pilot signal and compare it with a threshold by implementing these steps to be performed simultaneously with the dwelling step.

The present invention provides a method of synchronizing a cellular unit to a base station pilot signal, each base station's pilot signal being spread by a pseudo-random noise (PN) code having and a signal strength. A predetermined number of chips of the incoming signal is multiplied by a PN code having a first delay, and the energy accumulated. This is called "dwelling" at first delay. Then, the accumulant is processed, which will include a threshold comparison while the mobile unit dwells for a second set of chips at a second delay of the PN code. If desired, the first delay can be returned for further measurements.

An alternative summary of the present invention is a method of selecting a base station delay by using two banks. The first bank uses the hardware and software resources to analyze (dwell and compare) a first delay, and the second bank operates identically except that the second bank uses the resource not being used by the first bank at any one instant in time. That is, the system resources can be assigned and used simultaneously if they are assigned to different banks. For example, the first bank may be dwelling at a first phase while the second bank may be comparing its accumulant.

The present invention also provides for a mobile communications apparatus comprising a dwell accumulator resource, a digital signal processor (DSP) resource, and two banks. The resources and the banks are all interconnected to work together. The banks alternate to efficiently use the resource not being used by the other bank. Typically, a bank is a memory location which stores the data necessary for testing a given code phase and controls resources of the system in order to perform that testing.

Also provided for in the present invention is a machine-readable storage medium containing instructions for a processor to perform the techniques of the present invention.

These and other aspects, features, and advantages of the present invention will be apparent to those persons having ordinary skilled in the art to which the present invention relates from the foregoing description and the accompanying drawings.

DETAILED DESCRIPTION OF THE PREFERRED EMBODIMENT(S)

Figure 1:
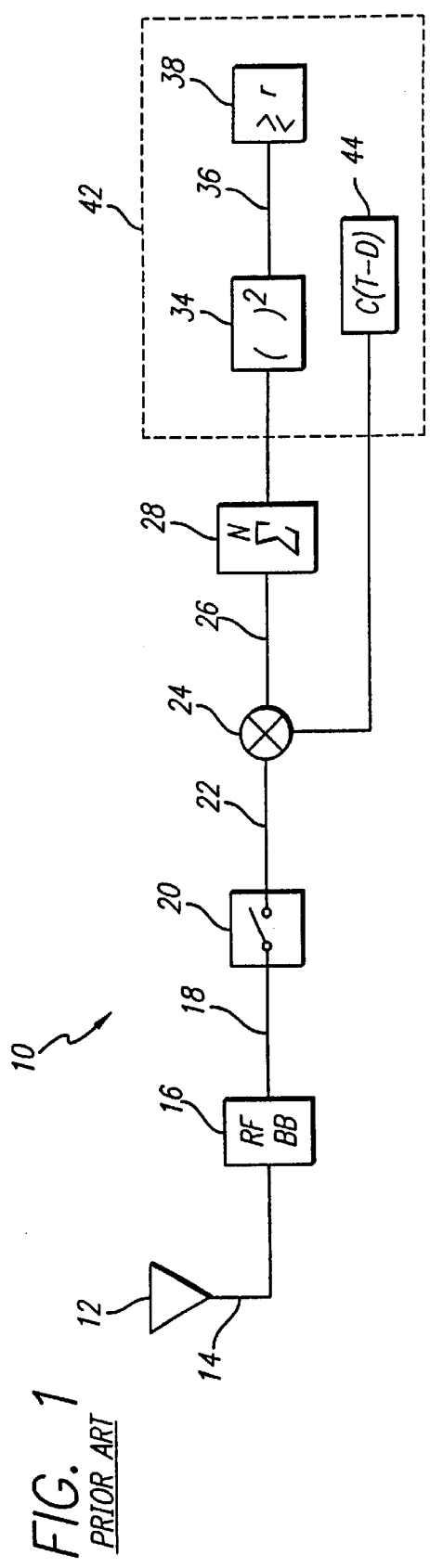
FIG. 1 is a simplified block diagram illustrating the major functions of a direct sequence spread spectrum mobile communications unit.
Figure 3:
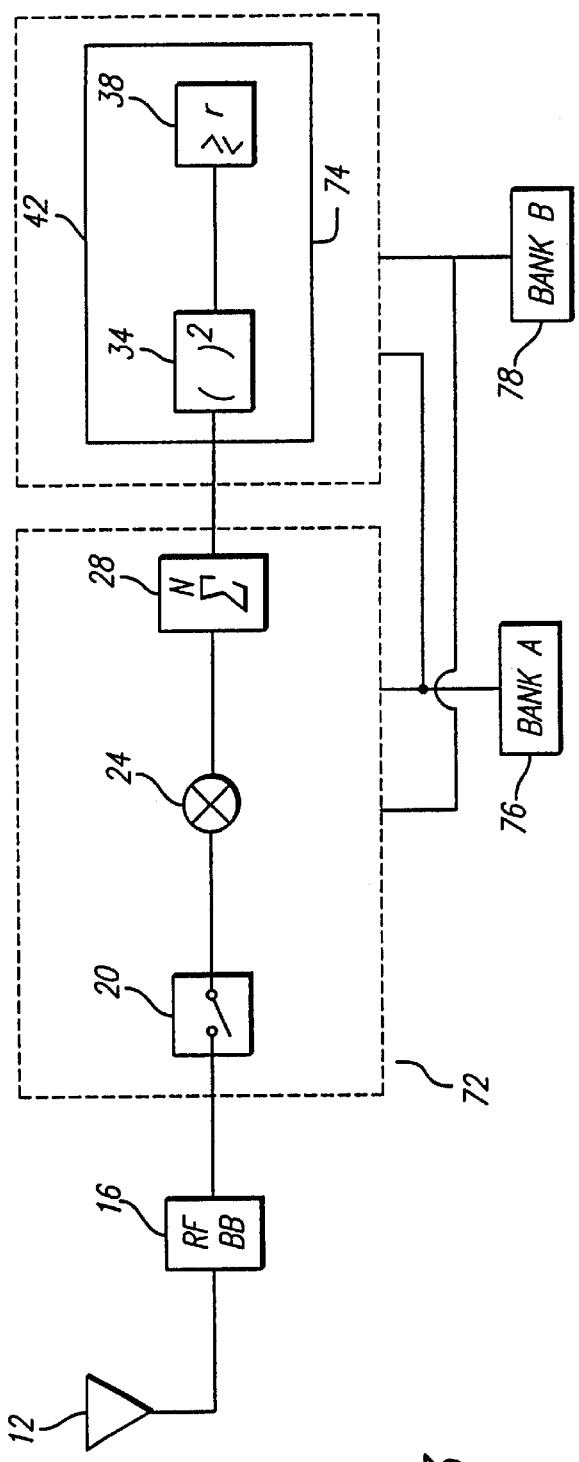
FIG. 3 is a block diagram illustrating an apparatus according to a preferred embodiment of the present invention.

Referring to FIG. 3, a mobile cellular unit according to the present invention is shown. Similar to the prior art unit of FIG. 1, the unit shown in FIG. 3 receives the pilot signal using an antenna 12, removes the radio carrier wave 16, and digitizes the signal 20. Then, the digitized signal is multiplied by a multiplier 24, the product is accumulated by an accumulator 28, and the accumulated energy is compared with a threshold by a DSP 42. The DSP 42 may square 34 the accumulant prior to comparing 38 the accumulant with the threshold.

The digitizer 20, the multiplier 24, and the accumulator 28, collectively, is used to "dwell" for N chips to accumulate its amplitude where N is a predetermined number of chips. The "dwell" operation comprises the steps of digitizing N chips 20, multiplying the chips to the mobile unit's pilot using a test delay 24, and accumulating the results of the multiplications 28. The collection of these circuits or these functions is referred to as a "dwell accumulator resource" 72. The portion of the DSP 42 which squares the accumulant 34 to generarge the energy and compares the energy to a threshold 38 is collectively referred to as a "DSP resource" 74.

In the prior art, these resources were used in a serial manner. That is, the dwell accumulator resource 72 is used while the DSP resource 74 waited for the dwell accumulator resource 72 to finish its operations. Then, the DSP resource 74 is used while the dwell accumulator resource 72 waited for the DSP resource 74 to finish its operations.

In the present invention, two banks 76 and 78 are provided. For simplicity, the banks are referred to as bank A 76 and bank B 78. Each of the banks 76 and 78 are connected to each of the resources 72 and 74 and interfaces with them. In an actual implementation, the banks are typically memory locations. In the present implementation, the banks are used to control the operations of the resources to allow the resources to operate simultaneously, or in parallel. Typically, a bank is a memory location which stores the data necessary for testing a given code phase and controls resources of the system in order to perform that testing.

Figure 2:
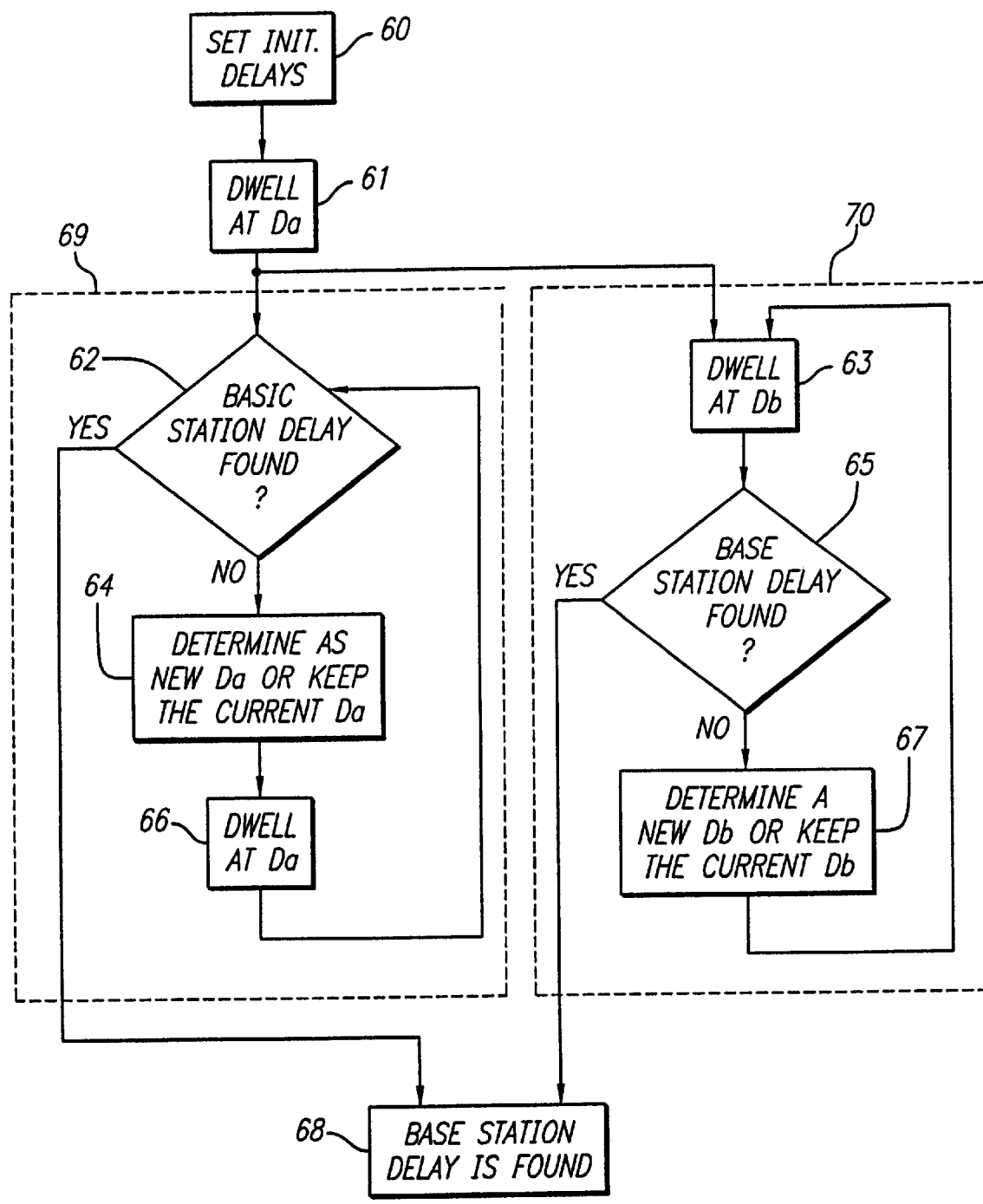
FIG. 2 is a flowchart illustrating the present invention.

The operations of the banks 76 and 78 with the resources 72 and 74 can be illustrated using the flowchart of FIG. 2.

Referring now to FIG. 2 but continuing to refer to FIG. 3, the initial step of the present invention technique is setting of the initial test delays for banks A and B. This operation is referred to by block 60 of the flowchart of FIG. 2. Typically, this operation involves setting the test delay for bank A 76, $D_a$, to 0 and the test delay for bank B 78, $D_b$, to 1. Then, one of the banks is given control of the dwell accumulator resource 72. In this example, bank A 76 is given the control of the resource 72 first, and the resource 72 dwells for N chips at the delay of $D_a$ as indicated by block 61.

After the dwell 61, bank A 76 is given control of the DSP resource 74 in order to test the accumulant. This operation is indicated by block 62. At the same time that bank A 76 is using the DSP resource 74, bank B 78 is given control of the dwell accumulator resource 72 to allow accumulation of the chips using the $D_b$ test delay. This operation is indicated by the block 63. Likewise, when bank B 78 is utilizing the DSP resource 74, bank A 76 is utilizing the dwell accumulator resource 72. In other words, operations represented by blocks 65 and 66 are simultaneous and the operations represented by blocks 62 and 63 are simultaneous.

Using this technique, the resources are efficiently used because neither of the resources is waiting for the other resource to complete its operation. In FIG. 2, the operations represented by the blocks within dashed-block 69 is performed using bank A and the operations represented by the blocks within dashed-block 70 is performed using bank B.

As indicated by blocks 62 and 67, the resultant accumulant of a dwell using a delay value is tested by comparing the accumulant to one or more predetermined threshold. In a preferred embodiment, the accumulant has a real component and an imaginary component. Thus, the accumulant is magnitude squared to remove the imaginary component and obtain the energy of the accumulant before being tested.

If the energy level is greater than a predetermined threshold ("accept threshold"), the process is halted and the delay, or the phase, of the code used to despread the chips for said accumulant is considered to be the base station delay. This operation is represented by block 68. If the energy level is less than another threshold ("reject threshold"), then the phase is rejected, and another phase is tested. If the energy level is indeterminate as to whether the tested phase is the phase of the base station, then the same phase can be tested again.

The accept threshold level is predetermined such that if the accumulant energy level exceeds the first threshold, then the tested code phase is the base station phase. The reject threshold level is predetermined such that if the accumulant energy level is less than the second, then the tested code phase can be rejected.

When the energy of the accumulant of bank A 76 or of the accumulant of bank B 78 exceeds the accept threshold, the process is halted and the delay, or the phase, of the code used to despread the chips for said accumulant is considered to be the base station delay. This operation is represented by block 68.

When the energy of the accumulant of bank A 76 or of the accumulant of bank B 78 is less than the reject threshold, then the tested code phase is rejected and another phase is tested. This is accomplished by setting the test delay value to another, new value and dwelling for another N chips. These operations are represented by the blocks 64 for $D_a$ and 67 for $D_b$. Typically, to change the delay value, the value is incremented or added to the delay value of the other bank. That is, when $D_a=0$ and $D_b=1$, then the next set of delay values tested are $D_a=2$ and $D_b=3$, and so on. However, the two test delay values are tested independently of each other.

When the energy of the accumulant of bank A 76 or of the accumulant of bank B 78 is indeterminate as to whether the tested phase is the phase of the base station, then the same phase can be tested again. This is accomplished by keeping the same code phase delay for another dwell-test cycle.

The delay value is not required to change between dwells. For instance, if the accumulant at $D_a=5$ leads to an inconclusive result as to the base station delay, then $D_a$ of 5 can be maintained to accumulate more chips for another dwell period, using the same delay value.

For example, assume that $D_a=0$ and $D_b=1$ for a particular dwell period. If the energy of the incoming signal at delay value of 0 does not meet the threshold, then $D_a$ is set to 2 for the next dwell cycle. On the other hand, if the energy of the incoming signal at delay value of 1 may or may not meet the threshold, then the value of $D_b$ is not changed to test, again, the incoming signal at delay 1. That is, the new value of $D_b$ is same as the old value.

Because an accumulant is being tested simultaneously with the next dwelling step, the time is used efficiently. Alternatively expressed, because $T_{average\_dwell\_time}$ and $T_{average\_computational\_time}$ are performed simultaneously, the new $T_{aa}$ is the larger, not the sum, of the two figures, or $$T_{aa}=\max(T_{average\_dwell\_time}, T_{average\_computational\_time})$$

The banks are controlled by the DSP, and the instructions for the DSP to control multiple banks may be stored in any machine readable storage medium such as a semiconductor memory device, magnetic device, optical device, magneto-optical device, floppy diskette, hard drive, CD-ROM, magnetic tape, computer memory, and memory card.

The present invention and adaptations of the present invention may be implemented in combination with other signal acquisition techniques. In particular, the present invention is well suited to be implemented with the modified multiple dwell search technique as disclosed by a patent application Ser. No. 08/956,056 entitled "METHOD AND APPARATUS FOR MULTI-DWELL SEARCH OF PILOT SIGNAL IN A CDMA COMMUNICATION SYSTEM." The entire patent application Ser. No. 08/956,056 entitled "METHOD AND APPARATUS FOR MULTI-DWELL SEARCH OF PILOT SIGNAL IN A CDMA COMMUNICATION SYSTEM," having three inventors—Roland Rick, Brian Banister, and Mark Davis—and being filed currently with the present patent application, is hereby incorporated in full into the present application.

Although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiment shown in the drawings and described in detail hereinabove. Therefore, it is intended that all such variations not departing from the spirit of the invention be considered as within the scope thereof as limited solely by the claims appended hereto.

In the following claims, those elements which do not include the words "means for" are intended not to be interpreted under 35 U.S.C.§112¶ 6.

What is claimed is:

1. A method of synchronizing a cellular unit to a base station signal, each base station's direct sequence spread spectrum pilot signal being spread by a pseudo-random noise (PN) code and having a signal strength, said method comprising:

dwelling for a first set of chips at a first delay of the PN code to produce an accumulant which is an accumulation of values; and comparing said accumulant to a threshold while dwelling for a second set of chips at a second delay of the PN code, wherein said step of dwelling for the first set of chips and said step of dwelling for the second set of chips are performed in a same processing path.

2. A method according to claim 1 further comprising the step of magnitude squaring said accumulant prior to comparing it to said threshold.

3. A method according to claim 1 wherein said step of dwelling comprises the steps:

multiplying a received signal with the PN code having said, first delay to obtain a sequence of products; and accumulating said products.

4. A method according to claim 1 wherein said threshold is predetermined to distinguish signal from noise.

5. A method according to claim 1, wherein a same apparatus used to perform said step of dwelling for the first set of chips is also used to dwell for the second set of chips while said accumulant is compared to the threshold.

6. A method of synchronizing a cellular unit to a base station signal, each base station's direct sequence spread spectrum pilot signal being spread by a pseudo-random noise (PN) code and having a signal strength, said method comprising the steps of:

determining values for a first delay phase and a second delay phase;

dwelling for a predetermined number of chips at said first delay phase to produce a first accumulant;

comparing said first accumulant to a threshold;

dwelling, simultaneous with said comparison of said first accumulant to said threshold, for said predetermined number of chips at said second delay phase to produce a second accumulant;

determining a new value for said first delay phase;

comparing said second accumulant to said threshold;

dwelling, simultaneous with said comparison of said second accumulant to said threshold, for said predetermined number of chips at the new value of said first delay phase to produce a new value for said first accumulant; and determining a new value for said second delay phase, wherein said steps of dwelling to produce the first accumulant, the second accumulant and the new value for the first accumulant are performed in a same processing path.

7. A method according to claim 6 further comprising a step of repeating said steps of claim 5 until said first accumulant is greater than said threshold.

8. A method according to claim 6 further comprising a step of repeating said steps of claim 5 until said second accumulant is greater than said threshold.

9. A method according to claim 6 wherein said step of determining a new value for said first delay comprises a step of incrementing said first delay.

10. A method according to claim 6 wherein said step of determining a new value for said first delay comprises a step of assigning to said first delay an incremented value of said second delay.

11. A method according to claim 6 wherein said first accumulant is stored in a first bank.

12. A method according to claim 6 further comprising a step of magnitude squaring said first accumulant prior to comparing it to said threshold.

13. A method according to claim 6 wherein said step of dwelling comprises the steps:
   multiplying a received signal with the PN code having a delay to obtain a sequence of products; and
   accumulating said products.

14. A method according to claim 6 wherein said threshold is predetermined to distinguish signal from noise.

15. A method according to claim 6, wherein said steps of dwelling to produce the first accumulant, the second accumulant and the new value for the first accumulant are performed by a same apparatus.

16. A machine-readable storage medium containing instructions for a processor, said instructions for synchronizing a mobile communications device to a base station signal having a base delay, said instructions comprising steps to:
   a. dwell for a first set of chips at a first delay of the PN code to produce an accumulant which is an accumulation of chip magnitudes; and
   b. compare said accumulant to a threshold while dwelling for a second set of chips at a second delay of the PN code,
      wherein said step to dwell for the first set of chips and said step to dwell for the second set of chips are performed in a same processing path.

17. A storage medium according to claim 16 wherein said storage medium is selected from a group consisting of semiconductor memory device, magnetic device, optical device, magneto-optical device, floppy diskette, hard drive, CD-ROM, magnetic tape, computer memory, and memory card.

18. A machine-readable storage medium according to claim 16, wherein said step to dwell for the first set of chips and said step to dwell for the second set of chips are performed by a same apparatus.

19. An apparatus for synchronizing a cellular unit to a base station signal, each base station's direct sequence spread spectrum pilot signal being spread by a pseudo-random noise (PN) code and having a signal strength, said apparatus comprising:
   means for dwelling for a first set of chips at a first delay of the PN code to produce an accumulant which is an accumulation of values; and
   means for comparing said accumulant to a threshold while dwelling for a second set of chips at a second delay of the PN code,
      wherein dwelling for the first set of chips and dwelling for the second set of chips are performed in a same processing path.

20. A method of synchronizing a cellular unit to a base station signal, each base station's direct sequence spread spectrum pilot signal being spread by a pseudo-random noise (PN) code and having a signal strength, said method comprising the steps of:
   determining values for a first delay phase and a second delay phase;
   dwelling for a predetermined number of chips at said first delay phase to produce a first accumulant;
   comparing said first accumulant to a threshold;
   dwelling, simultaneous with said comparison of said first accumulant to said threshold, for said predetermined number of chips at said second delay phase to produce a second accumulant;
   determining a new value for said first delay phase;
   comparing said second accumulant to said threshold;
   dwelling, simultaneous with said comparison of said second accumulant to said threshold, for said predetermined number of chips at the new value of said first delay phase to produce a new value for said first accumulant; and
   determining a new value for said second delay phase,
      wherein said step of determining a new value for said first delay comprises a step of assigning to said first delay an incremented value of said second delay.

21. An apparatus for synchronizing a cellular unit to a base station signal, each base station's direct sequence spread spectrum pilot signal being spread by a pseudo-random noise (PN) code and having a signal strength, said method comprising the steps of:
   (a) means for determining values for a first delay phase and a second delay phase;
   (b) means for dwelling for a predetermined number of chips at said first delay phase to produce a first accumulant;
   (c) means for comparing said first accumulant to a threshold;
   (d) means for dwelling, simultaneous with said comparison of said first accumulant to said threshold, for said predetermined number of chips at said second delay phase to produce a second accumulant;
   (e) means for determining a new value for said first delay phase;
   (f) means for comparing said second accumulant to said threshold;
   (g) means for dwelling, simultaneous with said comparison of said second accumulant to said threshold, for said predetermined number of chips at the new value of said first delay phase to produce a new value for said first accumulant; and (h) means for determining a new value for said second delay phase,
wherein determining the new value for said first delay comprises a step of assigning to said first delay an incremented value of said second delay.

22. An apparatus for synchronizing a cellular unit to a base station signal, each base station's direct sequence spread spectrum pilot signal being spread by a pseudo-random noise (PN) code and having a signal strength, said method comprising the steps of:

(a) means for determining values for a first delay phase and a second delay phase;

(b) means for dwelling for a predetermined number of chips at said first delay phase to produce a first accumulant;

(c) means for comparing said first accumulant to a threshold;

(d) means for dwelling, simultaneous with said comparison of said first accumulant to said threshold, for said predetermined number of chips at said second delay phase to produce a second accumulant;

(e) means for determining a new value for said first delay phase;

(f) means for comparing said second accumulant to said threshold;

(g) means for dwelling, simultaneous with said comparison of said second accumulant to said threshold, for said predetermined number of chips at the new value of said first delay phase to produce a new value for said first accumulant; and (h) means for determining a new value for said second delay phase,
wherein determining the new value for said first delay comprises a step of assigning to said first delay an incremented value of said second delay,
wherein said dwelling to produce the first accumulant, the second accumulant and the new value for the first accumulant are performed in a same processing path.

* * * * *